United States Patent [19]

Winsor, IV

[11] Patent Number: 5,349,493
[45] Date of Patent: Sep. 20, 1994

[54] ELECTRICAL CAPACITOR

[75] Inventor: Paul Winsor, IV, Somerset, Mass.

[73] Assignee: Aerovox Incorporated, New Beford, Mass.

[21] Appl. No.: 993,303

[22] Filed: Dec. 18, 1992

[51] Int. Cl.⁵ .......................... H01G 4/02; H01B 3/18
[52] U.S. Cl. ................................ 361/301.5; 361/314; 361/324; 361/327; 361/315; 252/62.2
[58] Field of Search ...................... 361/301.5, 314, 315, 361/324, 327; 252/62.2

[56] References Cited

U.S. PATENT DOCUMENTS

| | | |
|---|---|---|
| 2,421,241 | 5/1947 | Clark . |
| 2,947,927 | 8/1960 | Tracy et al. . |
| 3,588,644 | 6/1971 | Nash et al. . |
| 3,811,077 | 5/1974 | Munch . |
| 3,855,508 | 12/1974 | Ross et al. . |
| 3,948,787 | 4/1976 | Munch . |
| 4,292,462 | 9/1981 | Rey-Coquais . |
| 4,348,713 | 9/1982 | Grahame . |
| 4,467,395 | 8/1984 | Ross . |
| 4,513,349 | 4/1985 | Olson et al. . |
| 4,538,206 | 8/1985 | Shedigian . |
| 4,656,558 | 4/1987 | Bentley . |
| 5,014,033 | 5/1991 | Jay et al. . |

Primary Examiner—Marvin M. Lateef
Attorney, Agent, or Firm—Fish & Richardson

[57] ABSTRACT

An electrical film capacitor in which a pair of metal film electrodes and a porous layer are wound into an assembly, and in which the porous layer serves to wick a liquid dielectric into the wound assembly. The liquid dielectric is an adipic acid ester such as di-isononyl adipate. Mono-isopropyl biphenyl can be added as well.

19 Claims, 1 Drawing Sheet

ELECTRICAL CAPACITOR

BACKGROUND OF THE INVENTION

This invention relates to electrical film capacitors.

Electrical film capacitors are known. One type is exemplified by the Aerofoil®, Aerokraft®, and non-microwave Aeropak® capacitors sold by Aerovox, Inc. These capacitors feature strips wound or folded together. The strips include a pair of electrodes separated by a solid dielectric spacer. A portion of the capacitor is porous so that it can wick a liquid dielectric, thereby drawing the liquid dielectric into the bulk of the capacitor and causing it to fill the spaces between the strips throughout the capacitor. Examples of suitable materials for the porous portion include Kraft paper. The dielectric spacer may act as the porous portion. The porous portion can also form part of one or both of the electrodes (e.g., in the case of metallized paper electrodes). Examples of liquid dielectrics which have been used in these capacitors include aromatic phthalate esters such as di-octyl phthalate.

Smooth metallized film capacitors are a second type of electrical film capacitor. They typically include smooth metallized thermoplastic strips wound or folded together. Such capacitors have as their electrode the metallized portion of the strip and as the dielectric spacer the thermoplastic portion of the strip. These capacitors, however, lack a porous portion that can wick the liquid dielectric and draw it into the bulk of the capacitor. As a result, the liquid dielectric (even under vacuum impregnation) at best penetrates only the end regions of the capacitor, and even then only to a small degree (if at all). Consequently, the spaces between the strips in the interior of the capacitor (and indeed throughout most of the capacitor) are devoid of liquid dielectric.

Various aromatic and non-aromatic liquid dielectrics have been used to fill metallized film capacitors over the years. Ross et al., U.S. Pat. No. 3,855,508, for example, describes certain adipic acid esters (specifically, di-isooctyl adipate and di-isodecyl adipate) for this purpose. Tracy et al., U.S. Pat. No. 2,947,927 also describes certain adipic acid esters for use as liquid dielectrics in metallized film capacitors (specifically, di-isobutyl adipate, di-hexyl adipate, di-isooctyl adipate, and di-isohexyl adipate). Examples of aromatic liquid dielectrics include phthalate esters (e.g., di-octyl phthalate) and biphenyls (e.g., monoisopropyl biphenyl and halogenated biphenyls).

SUMMARY OF THE INVENTION

In general, the invention features an electrical film capacitor in which a pair of metal film electrodes and a porous layer are wound into an assembly, and in which the porous layer serves to wick an adipic acid ester liquid dielectric into the wound assembly.

In preferred embodiments, the adipic acid ester is di-isononyl adipate and the liquid dielectric further includes mono-isopropyl biphenyl. Preferably, the di-isononyl adipate and mono-isopropyl biphenyl are present in a 9:1 ratio.

In some preferred embodiments, the porous layer is a paper strip and serves as a dielectric layer, and the electrodes are metal foil electrodes. In other preferred embodiments, the porous layer is a part of at least one of the electrodes; e.g., one of the electrodes may be a metallized paper strip, with the paper serving to wick the adipic acid ester into the wound assembly.

The invention provides a capacitor having a liquid dielectric that not only has good dielectric properties, but is safe and has a viscosity that enables it to be readily processed as well.

Other features and advantages will be apparent from the following description of the preferred embodiments thereof, and from the claims.

DESCRIPTION OF THE PREFERRED EMBODIMENTS

Figure 1:
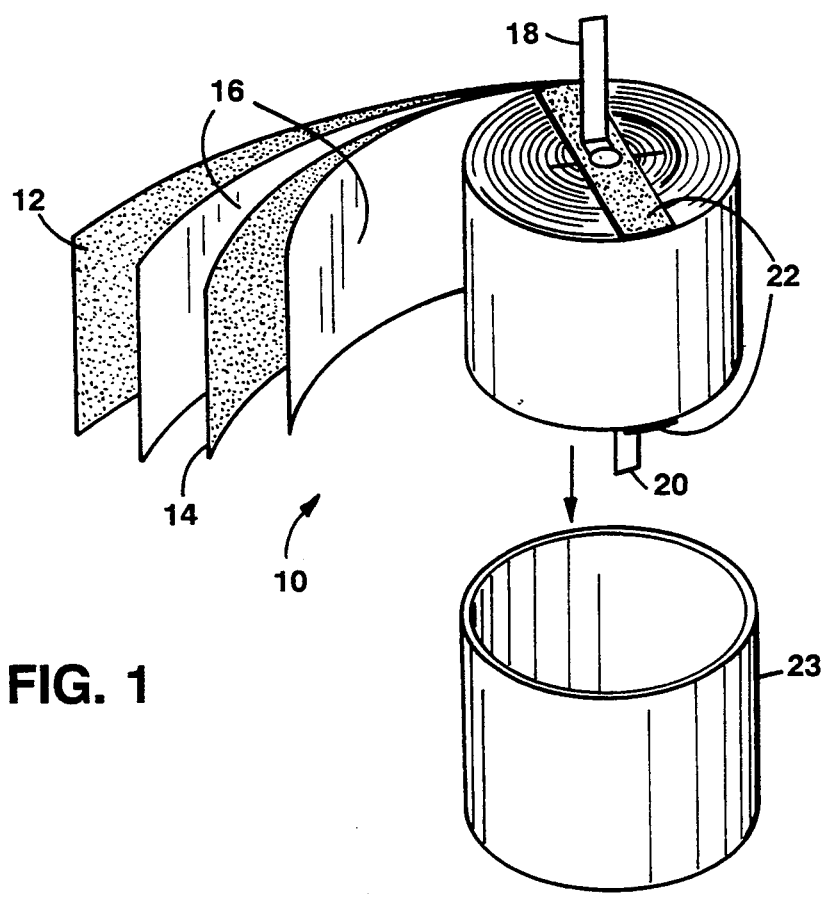
FIGS. 1 and 2 are perspective views of electrical film capacitor constructions having porous portions.

The capacitor is an electrical film capacitor in which a pair of thin film electrodes separated by a thin film dielectric material is wound into a wound assembly. One example of such a construction is shown in FIG. 1. Referring to FIG. 1, wound assembly 10 (in the form of a roll) includes an aluminum foil electrode 12 and a double metallized paper electrode 14 separated by a solid dielectric spacer (e.g., a polypropylene film) 16. The paper portion of electrode 14 is porous and thus wicks liquid dielectric, drawing it into the interior of the wound assembly; as a result, the spaces between strips throughout the assembly (as opposed to merely the end regions) are filled with liquid dielectric. A pair of electrical conductors 18, 20 form electrical connections. Two metallic end spray regions 22 (only one of which is shown), positioned at the top and bottom, respectively, complete the construction of the wound assembly. The assembly is surrounded by housing 23, which is sealed by a cover (not shown) to prevent leakage of the liquid dielectric.

Figure 2:
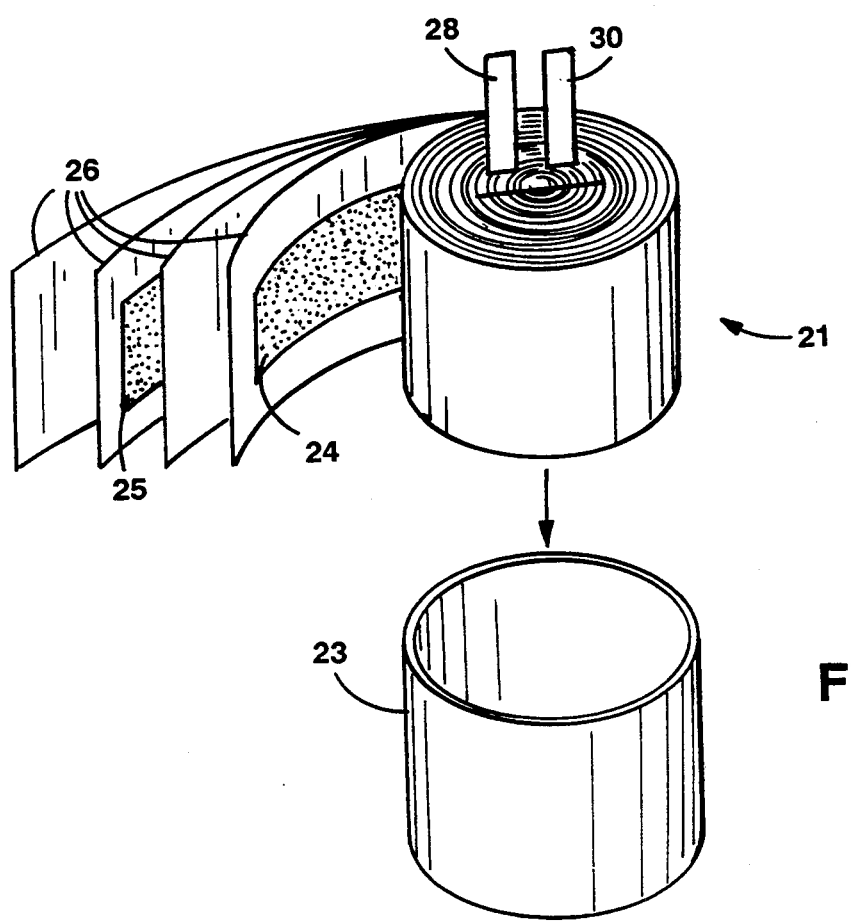

Another capacitor construction is shown in FIG. 2. Wound assembly 21 includes a pair of aluminum foil electrodes 25, 24 separated by strips of porous Kraft paper 26. The paper both wicks liquid dielectric and acts as a dielectric spacer. The electrodes and spacer are wound together to form a roll (but could, as well, have been folded, to form the wound assembly). A pair of tabs 28, 30 form electrical connections. Assembly 21 is retained in housing 23.

The liquid dielectric is incorporated into the capacitors as follows.

The capacitors are first baked in an air oven for 12 hours at 120° C. (±5° C.). The capacitors are then placed under vacuum for 30 minutes, followed by a 30 minute break in vacuum; this procedure is performed for a total of 4–8 times at 120° C. (±5° C.). Next, the capacitors are held under vacuum for 40–70 hours at 120° C., the vacuum being less than 100 microns for at least the last 8 hours, followed by cooling for 2 hours under vacuum to 62° C. (±8° C.). The capacitors are now ready for incorporation of the liquid dielectric.

The procedure is performed at 62° C. (±8° C.). The capacitors are placed in a tank which is slowly filled under vacuum with liquid dielectric until the capacitors are fully submerged in the liquid. The vacuum is then broken and the capacitors allowed to stand for 0.5 to 1 hour, after which the vacuum is re-applied for 1–2 hours (the vacuum being maintained at less than 100 microns). Next, the vacuum is broken and the capacitors allowed to soak in the liquid for another 10–30 hours. The capacitors are then removed from the tank, allowed to cool to room temperature, and sealed.

The preferred liquid dielectric is a 9:1 mixture of di-isononyl adipate (DINA) and mono-isopropyl biphenyl (MIPB). DINA is commercially available from Exxon Chemical Co. as JAYFLEX ® DINA. MIPB is commercially available from Koch Chemical Co. as SURE SOL®-250, Stabilizers (e.g., epoxy and/or ionol) may be added as well.

To determine the efficacy of the DINA/MIPB mixture, nine different liquid dielectric compositions (one of which was a 9:1 mixture of DINA and MIPB) were prepared and tested in five different capacitor constructions; not all compositions were tested in all capacitor constructions, The liquid dielectric compositions are summarized below in Table 1.

TABLE 1

| Composition | Major Component | Minor Component | Additives |
|---|---|---|---|
| A | 99.55% DOP[1] | 0% | 0.35% Epoxy 0.10% Ionol |
| B | 89.60% DINA[2] | 9.95% MIPB[3] | 0.35% Epoxy 0.10% Ionol |
| C | 79.64% DOP | 19.91% MIPB | 0.35% Epoxy 0.10% Ionol |
| D | 89.10% DOP | 9.90% MIPB | 1.0% Epoxy |
| E | 99.55% DINA | 0% | 0.35% Epoxy 0.10% Ionol |
| F | 89.60% TINT[4] | 9.95% MIPB | 0.35% Epoxy 0.10% Ionol |
| G | 99.55% TINT | 0% | 0.35% Epoxy 0.10% Ionol |
| H | 89.60% DINP[5] | 9.95% MIPB | 0.35% Epoxy 0.10% Ionol |
| I | 99.55% DINP | 0% | 0.35% Epoxy 0.10% Ionol |

[1]Di-octyl phthalate
[2]Di-isononyl adipate
[3]Mono-isopropyl biphenyl
[4]Tri-isononyl trimellitate
[5]Di-isononyl phthalate The capacitor/liquid dielectric combinations were subjected to four tests: accelerated lifetime tests at two different voltage/temperature combinations, measurement of the capacitance, and dielectric breakdown tests. Not all combinations were subjected to all four tests. The results are shown in Table 2. The first accelerated lifetime test is designated "a" in the left-hand vertical column of the table, the second accelerated lifetime test is designated "b," the dielectric breakdown (which is reported with its standard deviation) is designated "c," and the capacitance is designated "d."

The accelerated lifetime tests involved subjecting the capacitor to a particular voltage at a selected temperature for a particular amount of time, and determining when the device failed. The results are given in Table 2 in terms of number failed/number tested after a particular amount of time had elapsed. For example, "0/3 @1870 h" means that out of the 3 capacitors that were tested, none had failed after 1870 hours. The tests were conducted by the Aerovox AC test lab per the following protocol.

In the case of capacitor Nos. 1–3, the accelerated life test was conducted according to EIA 495. The voltage (at 60 Hz) was chosen to be 1.25 times the capacitor's AC voltage rating. The temperature was chosen to be the temperature rating of the capacitor plus 10° C.

In the case of capacitor Nos. 4–5, the accelerated life test was conducted according to EIA 454. The voltage (at 60 Hz) was chosen to be 1.5 times the capacitor's AC voltage rating. The temperature was chosen to be the temperature rating of the capacitor plus 10° C.

The capacitance was measured at 1 KHz in the case of capacitor Nos. 1–3 and at 100 Hz in the case of capacitor Nos. 4–5 using a Gen Rad 1657 Digibridge at 25° C.

The dielectric breakdown was measured by raising the DC voltage at a rate of 200–300 volts per second until the capacitor shorted or the power supply (100 Kohm output impedance) was unable to charge the capacitor to any higher voltage. It is reported as the average volts/$\mu$m, along with the standard deviation.

The structures of the five different capacitors used for the tests and the associated test parameters employed for the accelerated lifetime tests were as follows.

In capacitor No. 1, the winding included an aluminum foil electrode and a double metallized paper electrode separated by a 6 $\mu$m polypropylene dielectric. The following test parameters were employed for the accelerated lifetime tests:

"a": AC life tested at 656 V/100° C.
"b": AC life tested at 656 V/110° C.

In capacitor No. 2, the winding included an aluminum foil electrode and a double metallized paper electrode separated by a 7 $\mu$m polypropylene dielectric. The following test parameters were employed for the accelerated lifetime tests:

"a": AC life tested at 719 V/80° C.
"b": AC life tested at 850 V/80° C.

In capacitor No. 3, the winding included an aluminum foil electrode and a double metallized Kraft paper electrode separated by a 8 $\mu$m polypropylene dielectric. The following test parameters were employed for the accelerated lifetime tests:

"a": AC life tested at 850 V/100° C.
"b": not measured.

In capacitor No. 4, the winding included a pair of 0.70 mil aluminum foil electrodes separated by Kraft paper. The following test parameters were employed for the accelerated lifetime tests:

"a": AC life tested at 550 V/80° C.
"b": not measured.

In capacitor No. 5, the winding included a pair of 0.75 mil aluminum foil electrodes separated by Kraft paper. The following test parameters were employed for the accelerated lifetime tests:

"a": AC life tested at 550 V/80° C.
"b": AC life tested at 600 V/80° C.

TABLE 2

| | Liquid Dielectric Composition | | |
|---|---|---|---|
| | A | B | C |
| Capacitor #1 | | | |
| a | 0/3 @ 1870 h | 0/3 @ 1870 h | — |
| b | 0/3 @ 802 h | 1/3 @ 802 h | |
| | 0/3 @ 2104 h | 1/3 @ 2104 h | |
| c | 353 V/$\mu$m ± 14 | 407 V/$\mu$m ± 19 | — |
| d | 9.76 $\mu$F | 9.59 $\mu$F | |
| Capacitor #2 | | | |
| a | 0/2 @ 2009 h | 0/2 @ 2009 h | — |
| b | 0/4 @ 2071 h | 0/2 @ 2071 h | |
| c | 336 V/$\mu$m ± 27 | 329 V/$\mu$m ± 20 | — |
| d | 3.80 $\mu$F | 3.75 $\mu$F | |
| Capacitor #3 | | | |
| a | 1/5 @ 2011 h | 0/5 @ 2011 h | — |
| b | — | — | — |
| c | 345 V/$\mu$M ± 23 | 363 V/$\mu$m ± 29 | |
| d | 8.33 $\mu$F | 8.15 $\mu$F | |
| Capacitor #4 | | | |
| a | 4/8 @ 1032 h | 2/6 @ 1400 h | |
| | 7/8 @ 2327 h | 6/6 @ 1935 h | |
| b | — | — | — |
| c | 169 V/$\mu$m ± 15 | 191 V/$\mu$m | |

TABLE 2-continued

| | Liquid Dielectric Composition | | |
|---|---|---|---|
| d | 4.63 μF | 4.29 μF | — |
| Capacitor #5 | | | |
| a | — | — | 0/8 @ 2327 h |
| b | — | 0/4 @ 2021 h | — |
| c | — | — | 181 V/μm ± 9 |
| d | — | 4.64 μF | 5.03 μF |
| | D | E | F |
| Capacitor #1 | | | |
| a | — | — | 3/3 @ 455 h |
| b | 3/3 @ 226 h | — | 3/3 @ 99 h |
| c | 381 V/μm ± 13 | — | 393 V/μm ± 4 |
| d | 10.04 μF | — | 9.42 μF |
| Capacitor #2 | | | |
| a | — | 1/1 @ 1853 h | 0/2 @ 2009 h |
| b | — | 1/1 @ 109 h | 0/3 @ 2071 h |
| c | — | 364 V/μm ± 10 | 350 V/μm ± 10 |
| d | — | 3.72 μF | 3.76 μF |
| Capacitor #3 | | | |
| a | 4/4 @ 637 h | — | 5/5 @ 1108 h |
| b | — | — | — |
| c | 333 V/μm ± 19 | — | 373 V/μm ± 16 |
| d | 8.52 μF | — | 8.05 μF |
| Capacitor #4 | | | |
| a | — | — | 3/6 @ 887 h 6/6 @ 1266 h |
| b | — | — | — |
| c | — | — | — |
| d | — | — | 4.22 μF |
| Capacitor #5 | | | |
| a | — | 3/4 @ 1350 h | — |
| b | — | — | 4/4 @ 685 h |
| c | — | 210 V/μm | — |
| d | — | 4.44 μF | 4.41 μF |
| | G | H | I |
| Capacitor #1 | | | |
| a | — | — | — |
| b | — | — | — |
| c | — | — | — |
| d | — | — | — |
| Capacitor #2 | | | |
| a | 0/2 @ 2009 h | — | — |
| b | 1/2 @ 1040 h | — | — |
| c | 307 V/μm ± 51 | — | — |
| d | 3.72 μF | — | — |
| Capacitor #3 | | | |
| a | — | — | — |
| b | — | — | — |
| c | — | — | — |
| d | — | — | — |
| Capacitor #4 | | | |
| a | — | — | 0/8 @ 1625 h |
| | — | 0/8 @ 2327 h | 1/8 @ 2327 h |
| b | — | — | — |
| c | — | 152 V/μm ± 26 | 201 V/μm ± 26 |
| d | — | 4.62 μF | 4.66 μF |
| Capacitor #5 | | | |
| a | — | 0/8 @ 2327 h | 1/8 @ 2327 h |
| b | — | — | — |
| c | — | 180 V/μm | 160 V/μm ± 10 |
| d | — | 4.73 μF | 4.80 μF |

As shown in Table 2, the 9:1 DINA/MIPB composition (composition B) exhibited satisfactory properties compared to the DOP-based compositions (compositions A, C, and D). DINA, however, does not suffer from the toxicity problems posed by DOP. DINA, for example, has been approved by the United States Food and Drug Administration for use in food wraps.

Other embodiments are within the following claims. What is claimed is:

1. An electrical film capacitor comprising first and second film electrodes, a porous layer, and a liquid dielectric wicked along the extent of the porous layer, said first and second electrodes and porous layer being wound into a wound assembly, and said liquid dielectric consisting essentially of an adipic acid ester, alone or in combination with a biphenyl.

2. An electrical film capacitor, comprising
a first film electrode;
a second film electrode extending generally parallel to and electrically isolated and spaced from said first film electrode;
a porous layer extending generally parallel to said first and second film electrodes
said first film electrode and said porous together comprising a metallized paper layer;
a liquid dielectric wicked along the extent of the porous layer, said liquid dielectric comprising an adipic acid ester;
said first and second film electrodes being wound into a wound assembly;
within the wound assembly, said porous layer being positioned between portions of said first and second film electrode;
a housing surrounding said wound assembly, and retaining said liquid dielectric; and
electrical conductors providing an electrical connection between each of said first and second film electrodes and the exterior of said housing.

3. The electrical film capacitor of claims 1 or 2 further comprising a solid dielectric spacer layer separating said first and second film electrodes.

4. The electrical film capacitor of claim 1 wherein at least one of said film electrodes comprises a metallized layer on a surface of said porous layer.

5. The electrical film capacitor of claim 4 wherein said porous layer is paper, at least one surface of which is metallized.

6. The electrical film capacitor of claim 5 wherein said metallized paper layer forms said porous layer and said first film electrode, and wherein said second film electrode is a metal foil electrode.

7. The electrical film capacitor of claim 1 wherein said porous layer is one of the dielectric layers of the capacitor.

8. The electrical film capacitor of claim 7 wherein said porous layer comprises a layer of paper separate from said first and second film electrodes.

9. The electrical film capacitor of claim 8 wherein said first and second film electrodes are metal foil electrodes.

10. The electrical film capacitor of claim 1 wherein said first and second film electrodes are metal foil electrodes.

11. The electrical film capacitor of claims 1 or 2 wherein said wound assembly has been formed by folding said first and second film electrodes and porous layer.

12. The electrical film capacitor of claims 1 or 2 wherein said wound assembly has been formed by rolling up said first and second film electrodes and porous layer.

13. The capacitor of claims 1 or 2 wherein said adipic acid ester is di-isononyl adipate.

14. The capacitor of claims 1 or 2 wherein said liquid dielectric consists essentially of an adipic acid ester and mono-isopropyl biphenyl.

15. The capacitor of claim 13 wherein said liquid dielectric consists essentially of di-isononyl adipate and mono-isopropyl biphenyl.

16. The capacitor of claim 14 wherein said liquid dielectric consists essentially of an adipic acid ester and mono-isopropyl biphenyl in a 9:1 ratio.

17. The capacitor of claim 16 wherein said adipic acid ester is di-isononyl adipate.

18. The capacitor of claims 1 or 2 wherein said liquid dielectric consists essentially of an adipic acid ester and a biphenyl.

19. The capacitor of claims 1 or 2 wherein said liquid dielectric consists essentially of an adipic acid ester and a biphenyl in a 9:1 ratio.

* * * * *

UNITED STATES PATENT AND TRADEMARK OFFICE
CERTIFICATE OF CORRECTION

PATENT NO.    : 5,349,493

DATED         : September 20, 1994

INVENTOR(S)   : Paul Winsor IV

It is certified that error appears in the above-identified patent and that said Letters Patent is hereby corrected as shown below:

On cover page, [73] Assignee:, "New Beford" should be --New Bedford--.

Column 6, line 11, after "electrodes", insert --;--.

Column 6, line 12, after "porous", insert --layer--.

Signed and Sealed this

Twentieth Day of December, 1994

Attest:

BRUCE LEHMAN

*Attesting Officer*       *Commissioner of Patents and Trademarks*